(12) United States Patent
Penne et al.

(10) Patent No.: US 12,237,795 B2
(45) Date of Patent: Feb. 25, 2025

(54) ZERO SPEED VEHICLE BATTERY HEATING

(71) Applicant: FORD GLOBAL TECHNOLOGIES, LLC, Dearborn, MI (US)

(72) Inventors: Matthew Penne, Hadar, NE (US); Yang Xu, Canton, MI (US); Jonathan Hair, Northville, MI (US); Adeeb Ahmed, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 18/084,682

(22) Filed: Dec. 20, 2022

(65) Prior Publication Data
US 2024/0204712 A1    Jun. 20, 2024

(51) Int. Cl.
*H02P 29/68* (2016.01)
*B60K 6/28* (2007.10)
*B60L 58/27* (2019.01)

(52) U.S. Cl.
CPC .............. *H02P 29/68* (2016.02); *B60L 58/27* (2019.02); *B60K 6/28* (2013.01); *B60L 2240/12* (2013.01); *B60L 2240/425* (2013.01); *B60L 2240/429* (2013.01); *B60L 2240/545* (2013.01); *B60Y 2200/92* (2013.01)

(58) Field of Classification Search
CPC ...... H02P 29/68; B60L 58/27; B60L 2240/12; B60L 2240/425; B60L 2240/429; B60L 2240/545; B60K 6/28; B60Y 2200/92
USPC .................. 318/139, 641, 638, 560
See application file for complete search history.

(56) References Cited

U.S. PATENT DOCUMENTS

| | | | |
|---|---|---|---|
| 6,408,968 B1 * | 6/2002 | Wakashiro | B60L 58/18 903/917 |
| 6,554,088 B2 * | 4/2003 | Severinsky | B60K 6/22 180/65.23 |
| 8,866,428 B2 * | 10/2014 | Hao | H02P 29/64 318/641 |
| 8,976,063 B1 * | 3/2015 | Hawkins | G01S 5/017 342/357.32 |
| 11,290,045 B2 | 3/2022 | Shen | |
| 11,349,916 B2 | 5/2022 | Hrebicek et al. | |
| 2022/0234472 A1 | 7/2022 | Wang et al. | |

* cited by examiner

*Primary Examiner* — David Luo
(74) *Attorney, Agent, or Firm* — David B. Kelley; Brooks Kushman P.C.

(57) ABSTRACT

A vehicle includes an electric machine including a rotor. The vehicle further includes a traction battery configured to supply electric power to the electric machine. The vehicle further includes a wheel mechanically coupled to the electric machine. The vehicle further includes one or more controllers programmed to, responsive to detecting a battery temperature below a threshold and the vehicle being parked, rotate the rotor to a preset position such that the wheel rotates.

17 Claims, 4 Drawing Sheets

ZERO SPEED VEHICLE BATTERY HEATING

TECHNICAL FIELD

The present disclosure relates to a method for heating a vehicle battery when the vehicle is parked.

BACKGROUND

An electric vehicle may rely on one or more traction batteries supplying power to an electric machine for propulsion. The traction battery may be a lithium-ion battery. A battery heater may be used to heat up the battery in cold temperature.

SUMMARY

A vehicle includes an electric machine including a rotor. The vehicle further includes a traction battery configured to supply electric power to the electric machine. The vehicle further includes a wheel mechanically coupled to the electric machine. The vehicle further includes one or more controllers programmed to, responsive to detecting a battery temperature below a threshold and the vehicle being parked, rotate the rotor to a preset position such that the wheel rotates.

A method for a vehicle including an electric machine, a traction battery, and a wheel mechanically coupled to the electric machine, the method includes responsive to detecting a battery temperature below a threshold and the vehicle being parked, rotating a rotor of the electric machine to a preset position such that the wheel rotates.

A vehicle system includes an electric machine including a rotor. The vehicle system further includes one or more controllers programmed to, responsive to detecting a battery temperature below a threshold and the vehicle being parked, rotate the rotor to a preset position corresponding to a current angle that yields a maximum or minimum current magnitude for a phase of the electric machine and such that the wheel rotates.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system and method for heating up a traction battery of an electric vehicle.

Figure 1:
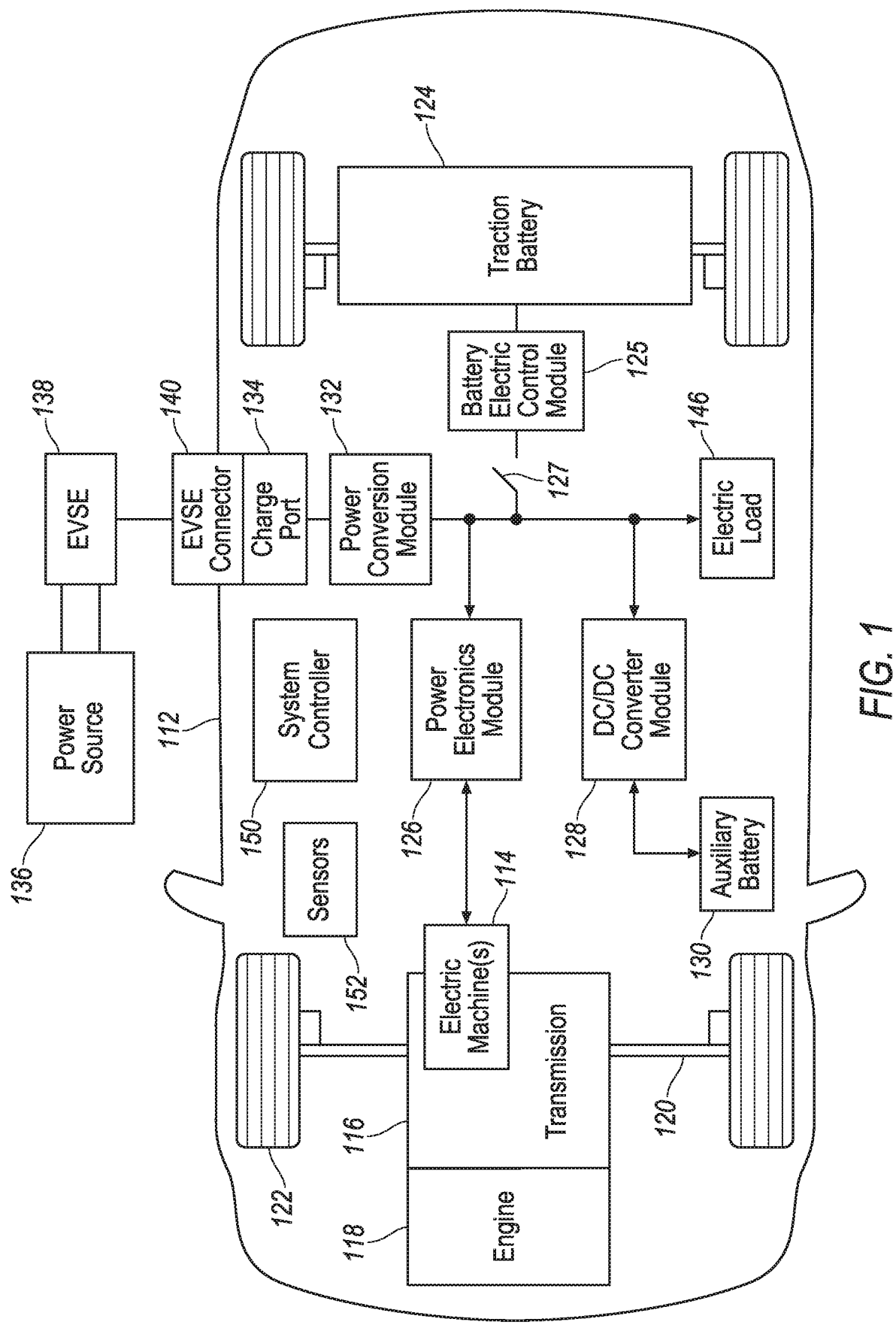
FIG. 1 illustrates an example block topology of an electrified vehicle illustrating drivetrain and energy storage components.

FIG. 1 illustrates a plug-in hybrid-electric vehicle (PHEV). A plug-in hybrid-electric vehicle 112 may comprise one or more electric machines (electric motors) 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 may provide propulsion and deceleration capability when the engine 118 is turned on or off. The electric machines 114 may also act as generators and may provide fuel economy benefits by recovering energy that would be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that may be used by the electric machines 114. A vehicle battery pack 124 may provide a high voltage DC output. The traction battery 124 may be electrically coupled to one or more battery electric control modules (BECM) 125. The BECM 125 may be provided with one or more processors and software applications configured to monitor and control various operations of the traction battery 124. The traction battery 124 may be further electrically coupled to one or more power electronics modules 126. The power electronics module 126 may also be referred to as a power inverter. One or more contactors 127 may isolate the traction battery 124 and the BECM 125 from other components when opened and couple the traction battery 124 and the BECM 125 to other components when closed. The power electronics module 126 may also be electrically coupled to the electric machines 114 and provide the ability to bi-directionally transfer energy between the traction battery 124 and the electric machines 114. For example, a traction battery 124 may provide a DC voltage while the electric machines 114 may operate using a three-phase AC current. The power electronics module 126 may convert the DC voltage to a three-phase AC current for use by the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to the electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other low-voltage vehicle loads. An output of the DC/DC converter module 128 may be electrically coupled to an auxiliary battery 130 (e.g., 12V battery).

The vehicle 112 may be a battery electric vehicle (BEV) or a plug-in hybrid electric vehicle (PHEV) in which the traction battery 124 may be recharged by an external power source 136. The external power source 136 may be a connection to an electrical outlet. The external power source 136 may be an electrical power distribution network or grid as provided by an electric utility company. The external power source 136 may be electrically coupled to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled may transfer power using a wireless inductive coupling.

One or more electrical loads 146 may be coupled to the high-voltage bus. The electrical loads 146 may have an associated controller that operates and controls the electrical loads 146 when appropriate. Examples of electrical loads 146 may be a heating module, an air-conditioning module, or the like.

The various components discussed may have one or more associated controllers to control and monitor the operations of the components. The controllers may communicate via a serial bus (e.g., Controller Area Network (CAN)) or via discrete conductors. A system controller 150 may be present to coordinate the operation of the various components. It is noted that the system controller 150 is used as a general term and may include one or more controller devices configured to perform various operations in the present disclosure. For instance, the system controller 150 may be programmed to enable a powertrain control function to operate the powertrain of the vehicle 112. The system controller 150 may be further programmed to enable a telecommunication function with various entities (e.g. a server) via a wireless network (e.g. a cellular network). The system controller 150 may be further programmed to enable an autonomous driving function of the vehicle 112 based on sensor data from one or more sensors 152. It is noted that the sensors 152 may include one or more hardware devices or software configured to perform detection, measurement, and/or processing to generate input data to the system controller 150. For instance, the sensors may include one or more radar or lidar sensors configured to detect objects within a predefined distance of the vehicle 112. The sensors 152 may further include one or more cameras configured to capture images from the vehicle 112.

The system controller 150 and/or BECM 125, individually or combined, may be programmed to perform various operations with regard to the traction battery 124. The traction battery 124 may be a rechargeable battery made of one or more rechargeable cells (e.g. lithium-ion cells). Due to the nature of the battery cells, the performance of the traction battery 124 may be poor in cold temperature, especially when the vehicle 112 is parked and the traction battery 124 is not being used. The system controller and/or BECM 125 may be configured to perform battery heating operations during parking.

The electric machines 114 may be of various types. For instance, the electric machines 114 may be a permanent magnet synchronous motor (PMSM) type machine. A PMSM electric machine includes a rotor and a stator. The stator may include windings for producing a magnetic field to rotate the rotor. Current through the stator windings may be controlled to vary the magnetic field acting on the rotor. The rotor of a PMSM includes permanent magnets that create a magnetic field that interacts with the stator magnetic field to cause rotation of the rotor. The rotor speed may be controlled by the frequency of the magnetic field created by the stator.

The electric machines 114 may include a stator that includes stator windings and a rotor. The rotor may rotate about a central axis relative to the stator. The electric machines 114 may be controlled by flowing a generally sinusoidal current through stator windings. The amplitude and frequency of the current may be varied to control the torque and speed of the rotor. The stator current creates an electromagnetic field that interacts with the permanent magnets that are part of the rotor. This electromagnetic field causes the rotor to rotate. The electric machines 114 may be configured as three-phase machines. That is, the stator windings may include three separate phase windings. To control the electric machines 114, a three-phase voltage or current waveform is applied to the phase windings. The three-phase waveform is such that each phase signal is separated by a phase difference of 120 degrees.

Figure 2:
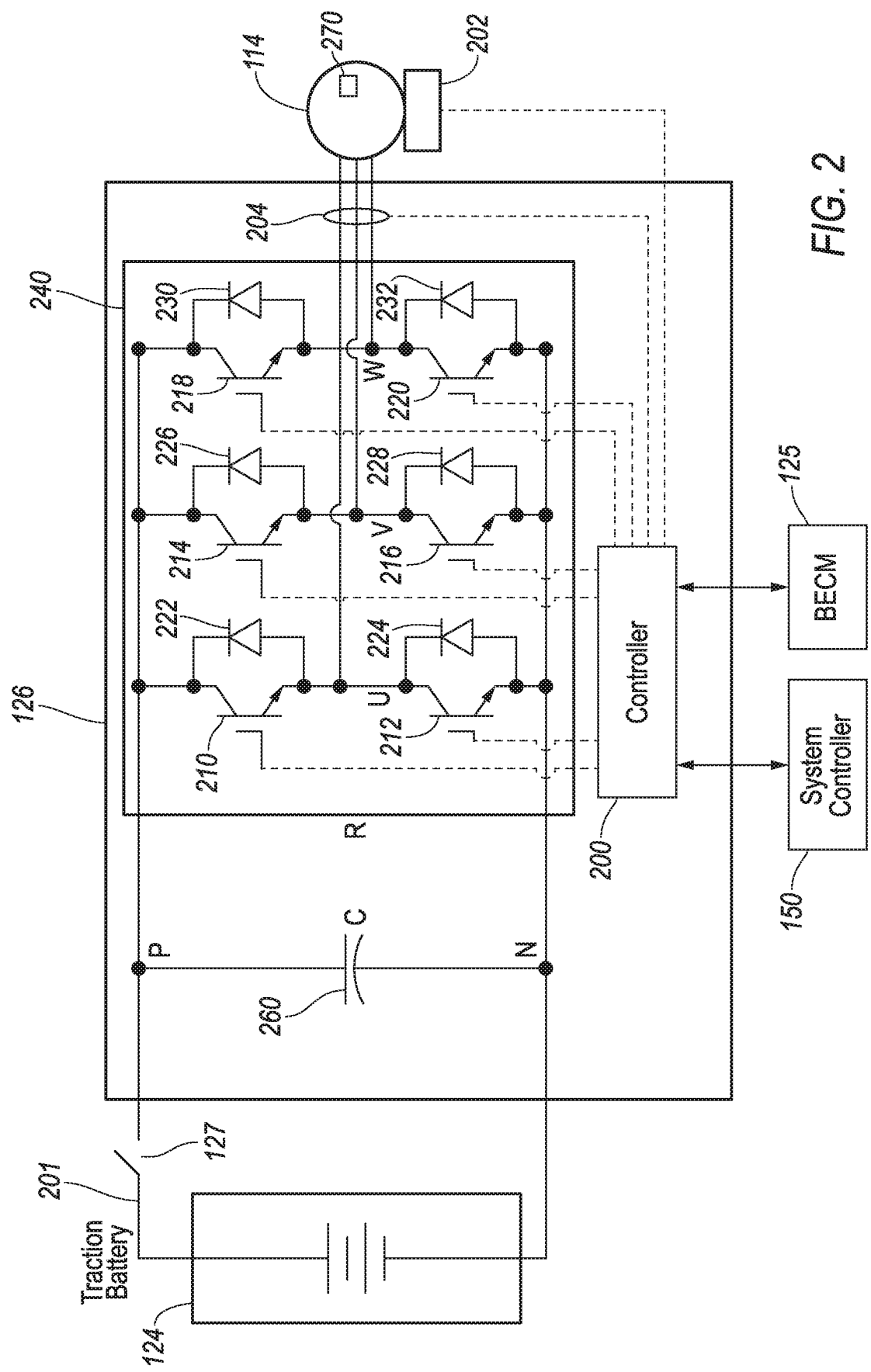
FIG. 2 illustrates a configuration for a vehicle system including power electronics associated with an electric machine.

The electric machines 114 may be coupled to the power electronics module 126 via one or more conductors that are associated with each of the phase windings. FIG. 2 depicts a block diagram of a vehicle system that includes a motor control system. The vehicle 112 may include one or more power electronics controllers 200 configured to monitor and control the power electronics module 126. The power electronics controller 200 may be configured to communicate with the system controllers 150 and/or the BECM 125 to collectively operate power electronic module 126. The conductors may be part of a wiring harness between the electric machine 114 and the power electronics module 126. A three-phase electric machine 114 may have three conductors coupled to the power electronics module 126. The power electronics module 126 may be configured to switch positive and negative terminals of the high-voltage bus 201 to phase terminals of the electric machines 114.

The power electronics module 126 may be controlled to provide sinusoidal voltage and current signals to the electric machine 114. The frequency of the signals may be proportional to the rotational speed of the electric machine 114.

The controller 200 may be configured to adjust the voltage and current output of the power electronics module 126 at a predetermined switching frequency. The switching frequency may be the rate at which the states of switching devices within the power electronics module 126 are changed. The frequency of the injection voltage may be selected as a predetermined multiple of the switching frequency.

The power electronics module 126 may interface with a position/speed feedback device 202 that is coupled to the rotor of the electric machine 114. For example, the position/speed feedback device 202 may be a resolver or an encoder.

The position/speed feedback device 202 may provide signals indicative of a position and/or speed of the rotor of the electric machine 114. The power electronics controller 200 interfaces to the speed feedback device 202 and processes signals from the speed feedback device 202. The power electronics controller 200 may be programmed to utilize the speed and position feedback to control operation of the electric machine 114.

The power electronics 126 may include power switching circuitry 240 that includes a plurality of switching devices 210, 212, 214, 216, 218, 220. The switching devices may be Insulated Gate Bipolar Junction Transistors (IGBTs) or other solid-state switching devices. The switching devices may be configured to selectively couple a positive terminal and a negative terminal of the high-voltage bus 201 to each phase terminal or leg (e.g., labeled U, V, W) of the electric machine 114. Each of the switching devices within the power switching circuitry 240 may have an associated diode 222, 224, 226, 228 230, 232 connected in parallel to provide a path for inductive current when the switching device is in a non-conducting state. Each of the switching devices 210, 212, 214, 216, 218, 220 may have a control terminal for controlling operation of the associated switching device. The control terminals may be electrically coupled to the power electronics controller 200. The power electronics controller 200 may include associated circuitry to drive and monitor the control terminals. For example, the control terminals may be coupled to the gate input of the solid-state switching devices.

A first switching device 210 may selectively couple the HV-bus positive terminal to a first phase terminal (e.g., U) of the electric machine 114. A first diode 222 may be coupled in parallel to the first switching device 210. A second switching device 212 may selectively couple the HV-bus negative terminal to the first phase terminal (e.g., U) of the electric machine 114. A second diode 224 may be coupled in parallel to the second switching device 212. A third switching device 214 may selectively couple the HV-bus positive terminal to a second phase terminal (e.g., V) of the electric machine 114. A third diode 226 may be coupled in parallel to the third switching device 214. A fourth switching device 216 may selectively couple the HV-bus negative terminal to the second phase terminal (e.g., V) of the electric machine 114. A fourth diode 228 may be coupled in parallel to the fourth switching device 216. A fifth switching device 218 may selectively couple the HV-bus positive terminal to a third phase terminal (e.g., W) of the electric machine 114. A fifth diode 230 may be coupled in parallel to the fifth switching device 218. A sixth switching device 220 may selectively couple the HV-bus negative terminal to the third phase terminal (e.g., W) of the electric machine 114. A sixth diode 232 may be coupled in parallel to the sixth switching device 220.

The power electronics controller 200 may be programmed to operate the switching devices 210, 212, 214, 216, 218, 220 to control the voltage and current applied to the phase windings of the electric machine 114. The power electronics controller 200 may operate the switching devices 210, 212, 214, 216, 218, 220 so that each phase terminal is coupled to only one of the HV-bus positive terminal or the HV-bus negative terminal at a particular time.

Various motor control algorithms and strategies are available to be implemented in the power electronics controller 200. The power electronics module 126 may also include current sensors 204. The current sensors 204 may be inductive or Hall-effect devices configured to generate a signal indicative of the current passing through the associated circuit. In some configurations, two current sensors 204 may be utilized and the third phase current may be calculated from the two measured currents. The controller 200 may sample the current sensors 204 at a predetermined sampling rate. Measurement values for the phase currents of the electric machine 114 may be stored in controller memory for later computations.

The power electronics module 126 may include one or more voltage sensors. The voltage sensors may be configured to measure an input voltage to the power electronics module 126 and/or one or more of the output voltages of the power electronics module 126. The voltage sensors may be resistive networks and include isolation elements to separate high-voltage levels from the low-voltage system. In addition, the power electronics module 126 may include associated circuitry for scaling and filtering the signals from the current sensors 204 and the voltage sensors.

Under normal operating conditions, the power electronics controller 200 controls operation of the electric machine 114. For example, in response to torque and/or speed setpoints, the power electronics controller 200 may operate the switching devices 210, 212, 214, 216, 218, 220 to control the torque and speed of the electric machine 114 to achieve the setpoints. The torque and/or speed setpoints may be processed to generate a desired switching pattern for the switching devices 210, 212, 214, 216, 218, 220. The control terminals of the switching devices 210, 212, 214, 216, 218, 220 may be driven with Pulse Width Modulated (PWM) signals to control the torque and speed of electric machine 114. The power electronics controller 200 may implement various well-known control strategies to control the electric machine 114 using the switching devices such as vector control and/or six-step control. During normal operating conditions, the switching devices 210, 212, 214, 216, 218, 220 are actively controlled to achieve a desired current through each phase of the electric machine 114.

The power electronics module 126 may further include one or more capacitors connected across the high-voltage bus 201. For instance, a DC bus capacitor 260 (DC link capacitor) may be connected across the high-voltage bus 201 to maintain the voltage drop between the positive and negative terminals of the high-voltage bus 201. The DC bus capacitor 260 may be further configured to filter ripple currents generated at battery 124 and stabilize the voltage across the high-voltage bus 201. Although the DC bus capacitor 260 is illustrated as a single capacitor in FIG. 2, it is noted that the present disclosure is not limited thereto and the DC bus capacitor 260 may include a plurality of capacitors under various configurations. When the power electronics module 126 is in operation, the DC bus capacitor 260 is charged such that the voltage across the positive and negative terminals of the high-voltage bus 201 may be maintained. When the vehicle is parked and switched off, the DC bus capacitor 260 may be discharged to discharge the high-voltage bus 201. The power electronics controller 200 may apply a discharge current on the d-axis to create loss in electric machine windings which in turn discharges energy stored in the DC bus capacitor 260 when the vehicle is parked. The discharge current is preferably applied only to the d-axis of the electric machine 114 without any q-axis component such that the DC bus capacitor 260 may be discharged without causing any rotor rotation of the electric machine 114.

A resolver offset is characterized once the electric machine is assembled and this resolver offset is used to adjust the rotor position reading in the power electronics controller 200 so that current angle can be properly aligned to the desired rotor position, relative to a magnetic circuit. In other words, the power electronics controller 200 needs an accurate resolver offset value to precisely apply the discharge current to the d-axis only without incurring any q-axis component.

The electric machine 114 may include a temperature sensor or thermistor 270 configured to measure the temperature of the electric machine 114. More specifically, the thermistor 270 may be located at the stator for temperature measurements. Although multiple thermistors may increase the measurement accuracy of the electric machine 114, only one thermistor 270 is provided in the present example for cost saving. As discussed above the motor 114 may be provided with multiple windings corresponding to the three phases. If only one thermistor 270 is provided, it may be impractical for the thermistor 270 to monitor and measure the temperature of the windings corresponding to all of the three phases. Instead, in one example, the thermistor 270 may be placed on windings corresponding to only one of the three phases. In this case, the thermistor 270 may monitor the winding temperature corresponding the single phase without being able to monitor the winding temperature corresponding to the rest two phases. Alternatively, thermistor 270 may be placed between windings corresponding to two of the three phases. In this alternative example, the thermistor 270 may monitor the winding temperature corresponding to the two phases without being able to monitor the winding temperature of the remaining one phase. In sum, in the case that only one thermistor is provided, it may be impractical to monitor the winding temperature of all three phases of the electric machine 114.

The inability to monitor all three phases may not cause an issue when the vehicle is being driven as the current evenly flows through all phase windings rendering essentially the same temperature on the windings. However, when the current is unevenly injected into stator windings, the single thermistor 270 may be unable to accurately measure the temperature of the electric machine 114. For instance, when the vehicle 112 is parked in cold temperature, the power electronics controller 200 may inject a d-axis current into the electric machine 114 to warm up the traction battery 124. The vehicle 112 may be provided with a coolant loop thermally conveying the heat generated at the electric machine 114 to the traction battery 124. Depending on the rotor position relative to the stator when the vehicle is parked, the d-axis current may unevenly flow through the windings corresponding to each phase of the stator. If the d-axis current primarily flows to the winding that is unmonitored by the thermistor, more heat may be generated on that unmonitored winding making it hotter than the windings corresponding to the other two monitored phases.

Figure 3:
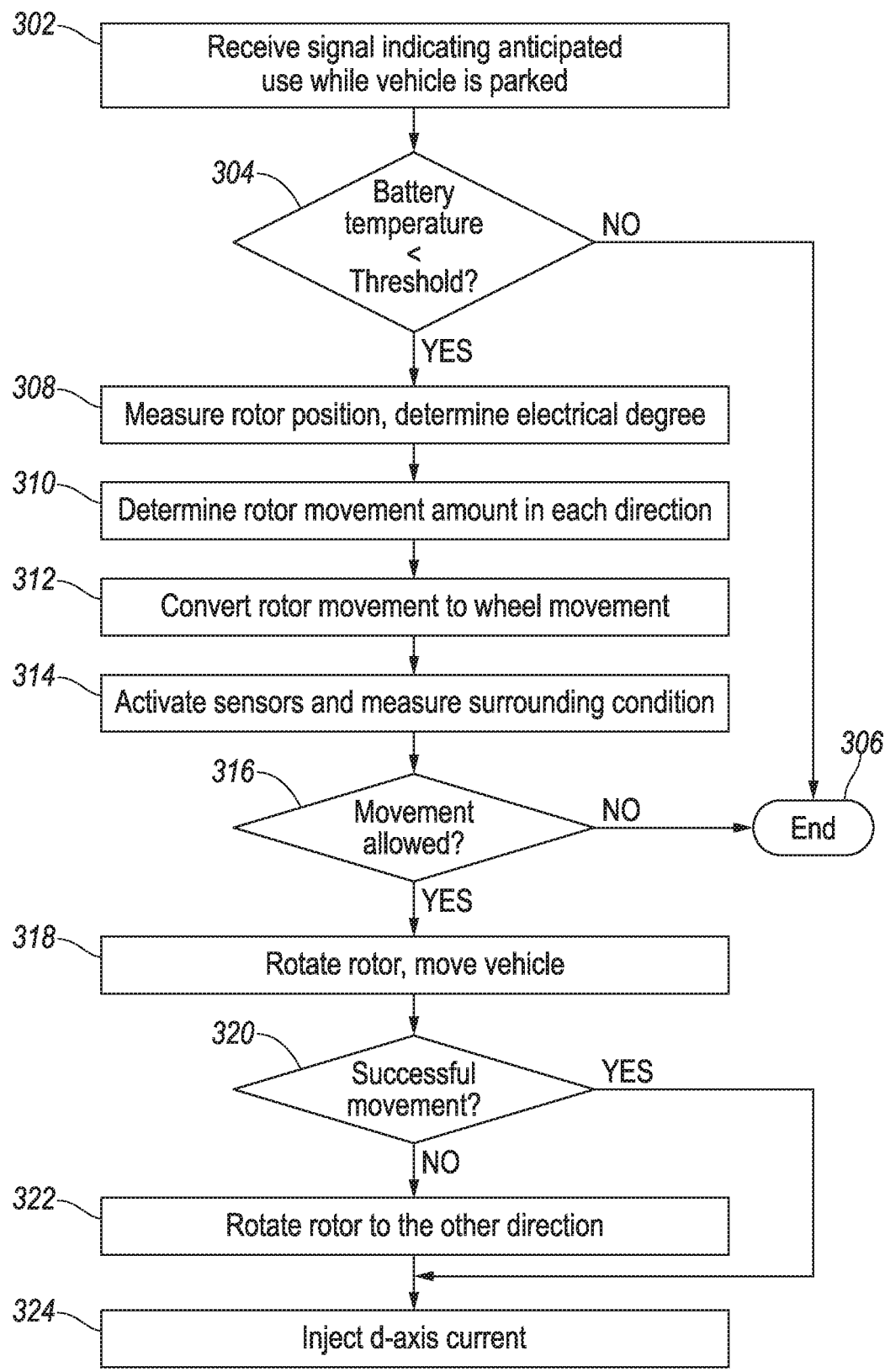
FIG. 3 illustrates a flow diagram of a process of one embodiment of the present disclosure.

Referring to FIG. 3, an example flow diagram of a process 300 for warming up the vehicle battery when the vehicle is parked of the present disclosure is illustrated. With continuing reference to FIGS. 1 and 2, the process 300 may be individually or collectively implemented via one or more of the system controller 150, BECM 125 and/or the power electronics controller 200. For simplicity, the following description will be made with reference to the system controller 150. At operation 302, the system controller receives a signal indicative of an anticipated using of the vehicle while the vehicle is parked. The signal may be received in various manners. For instance, a vehicle user may send a remote start command to the vehicle 112 indicative of an anticipated trip in the near future. Additionally or alternatively, the system controller 150 may have access to a user calendar which records an upcoming trip. In response, at operation 304, the system controller verifies the battery temperature is below a predefined threshold. The performance of the traction battery 124 may be affected by the cold temperature. The traction battery 124 may be provided with a battery sensor (not shown) configured to measure the temperature of one or more battery cells. Alternatively, the system controller 150 may use an ambient temperature measured by a vehicle ambient temperature sensor 152 in addition to or in lieu of the battery sensor to perform the verification at operation 304. If the battery temperature is above the threshold, the process proceeds to operation 306 and the process ends without taking any further actions. Otherwise, if the battery temperature is below the threshold, the process proceeds to operation 308.

At operation 308, the system controller 150 measures the rotor position relative to the stator and determines the electric degree for each current phase. When the vehicle is parked, the rotor may stop at a position that is undesirable for d-axis current injection due to the configuration of the thermistor 270 as discussed above. Therefore, at operation 310, the system controller 150 determines the amount of rotor movement required in each direction (i.e. forward and backward) to adjust the rotor into a preset position designated for the d-axis current injection. There may be a plurality of configurations for the preset position for the rotor. In one example in which the thermistor 270 is configured to monitor windings associated within only one phase, the preset position may be one or more positions at which the monitored phase has the maximum current magnitude. In an alternative example in which the thermistor 270 is placed between windings corresponding to two phases, the preset position may be one or more positions at which the unmonitored phase is at zero current magnitude.

Depending on the drivetrain configuration of the vehicle 112, the electric machine 114 may be mechanically coupled to the vehicle wheels even when the vehicle 112 is parked. In this case, rotating the rotor of the electric machine 114 may cause the vehicle wheels to rotate correspondingly. In other words, the vehicle may be required to physically move forward or backward for the electric machine 114 to perform the rotor rotation. At operation 312, the system controller 150 converts the rotor rotation amount to vehicle wheel movement in each direction. Depending on the parking condition of the vehicle 112, physical movement of the vehicle 112 in certain directions may or may not be available. At operation 314, the system controller 150 activates the vehicle sensors to measure the surrounding condition of the vehicle 112 to determine if the vehicle movement converted at operation 312 is available in either direction. If the vehicle movement is unavailable in either direction, the process proceeds to operation 306. Otherwise, if the vehicle movement is available in at least one direction, the process proceeds to operation 318 and the system controller 150 operates the electric machine to rotate to the preset position. In general, a short vehicle movement distance is preferred. In case that vehicle movement in both forward and backward directions are available, the system controller may select the movement with the shortest distance. For instance, if the forward movement requires 1 cm distance and the backward movement requires 2 cm distance, the system controller 150 may rotate the electric machine 114 to move the vehicle 112 forward. The system controller 150 may further operate the steering of the vehicle to facilitate the movement. For instance, the steering wheel may not be straight when the driver parked the vehicle. The system controller 150 may straighten the steering wheel before performing the rotor movement to avoid moving the vehicle 112 into an undesirable parking position. At operation 320, the system controller 150 verifies if the rotor/vehicle movement has been successfully performed. In some situations, objects that are not detected by the vehicle sensors 152 may prevent the vehicle 112 from moving to the desired location. For instance, a low-profile parking block (or wheel stop, parking curb) preventing the wheel rotation in one direction may be undetected by sensors 152. Responsive to detecting the selected vehicle movement has failed (e.g. blocked by a parking block), the process proceeds to operation 322 and the system controller 150 restores the rotor to the original position before the rotation. In case that opposite vehicle movement direction is available, the system controller 150 may operate the rotor as well as the vehicle to rotate to the preset position in the alternative direction operate to the direction in the original attempt. At operation 324, responsive to detecting the rotor has been arrived at the present position, the system controller 150 injects the d-axis current into the electric machine 114.

Figure 4:
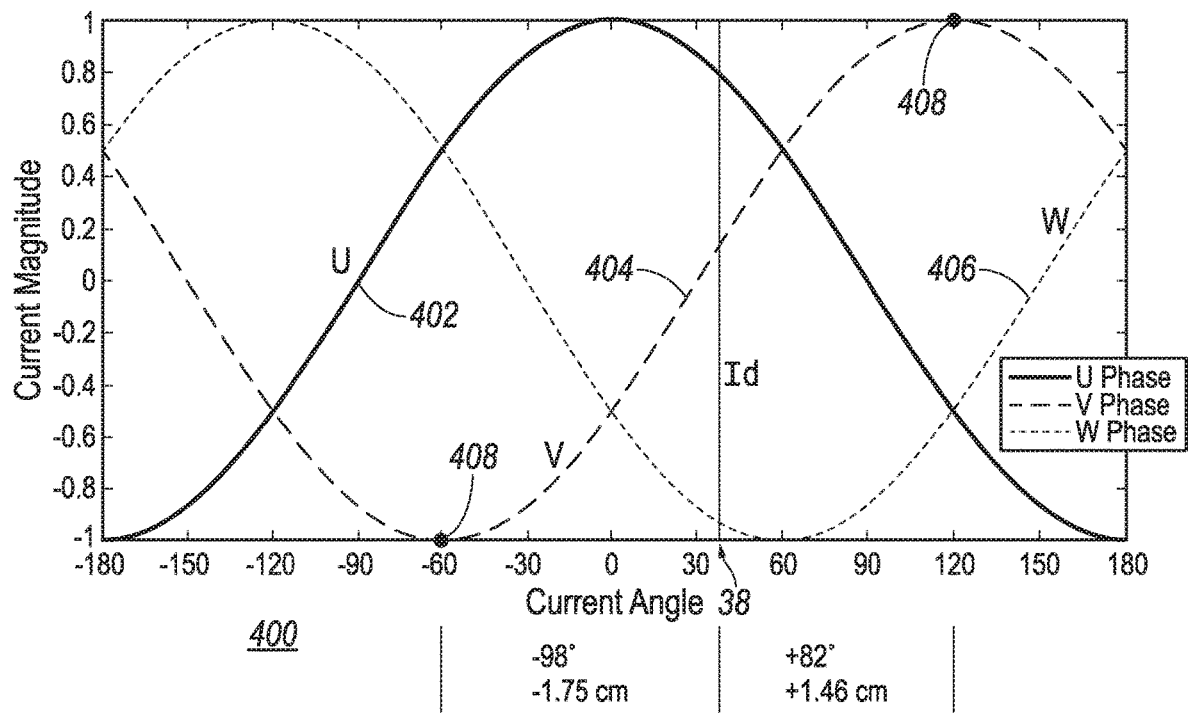
FIG. 4 illustrates a waveform diagram of the current phases of one embodiment of the present disclosure.

The operations of process 300 may be applied to various situations. Referring to FIG. 4, a waveform diagram 400 illustrating the phase current of one embodiment of the present disclosure is illustrated. In FIG. 4, the horizontal axis represents the current angle (or electric degree) in the unit of degree and the vertical axis represents the normalized current magnitude (with the maximum magnitude of one) of each of the three phases of the electric machine 114. There are three waveforms illustrated in FIG. 4. Waveforms 402, 404 and 406 denote the current magnitude of the U, V and W phases over different electrical degrees respectfully. As can be seen from FIG. 4, each of the U, V and W phases are separated by 120° in current angle. In the present example, the thermistor 270 is configured to only monitor windings corresponding to the V phase of the electric machine 114. Therefore, present rotor positions for the d-axis current injection are the electric degrees where the V phase current is at the maximum magnitude regardless of the current direction. As illustrated on waveform 404, the magnitude for the V phase current is the maximum at −60° and +120° current angles which are the preset positions 408 for the rotor for the d-axis current injection. According to the signal from the position/speed feedback device 202, the d-axis of the electric machine 114 is at 38° when the vehicle is parked. In order to arrive at the preset positions, the rotor may need to rotate either 98° in the negative direction or 82° in the positive direction. The rotation angles of the rotor may be converted into an actual distance of movement of 1.75 cm in the reverse direction and 1.46 cm in the forward direction. With the rotor rotation and vehicle movement amount calculated, the system controller 150 may perform the operations discussed with reference to process 300 before performing the d-axis current injections.

Figure 5:
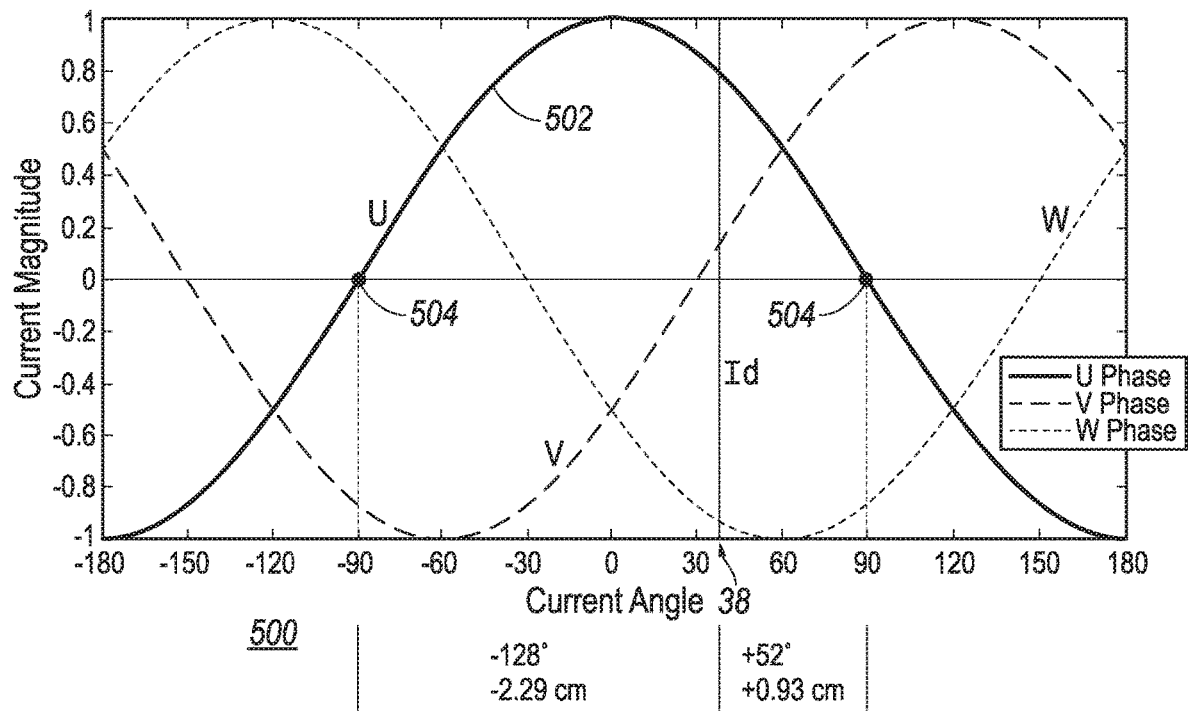
FIG. 5 illustrates a waveform diagram of the current phases of another embodiment of the present disclosure.

Referring to FIG. 5, a waveform diagram 500 illustrating the phase current of another embodiment of the present disclosure is illustrated. The electric machine configuration in the present example is the same to the example illustrated with reference to FIG. 4 except that the thermistor 270 is placed between the windings corresponding to both the V phase and W phase. In other words, the thermistor 270 monitors both the V phase and W phase and the only unmonitored phase in the present example is the U phase. Since there is only one phase that is unmonitored, the preset rotor position for d-axis current injection is at one or more current angles where the unmonitored U phase is at zero magnitude. According to the waveform 502 denoting the U phase current, the preset positions 504 are −90° and +90°. Similar to the example illustrated with reference to FIG. 4, since the d-axis of the electric machine 114 is at 38° when the vehicle is parked, the rotor may need to rotate either 128° in the negative direction or 52° in the positive direction to arrive at the preset position. The rotation angle may be converted to a distance of vehicle movement of 2.29 cm in the reverse direction and 0.93 cm in the forward direction.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, case of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an electric machine including a rotor;
a traction battery configured to supply electric power to the electric machine;
a wheel mechanically coupled to the electric machine; and
one or more controllers programmed to, responsive to detecting a battery temperature below a threshold and the vehicle being parked, rotate the rotor to a preset position such that the wheel rotates.

2. The vehicle of claim 1, wherein the preset position corresponds to a current angle that yields a maximum current magnitude for a phase of the electric machine.

3. The vehicle of claim 2, further comprising a thermistor configured to measure a temperature of the phase.

4. The vehicle of claim 1, wherein the preset position corresponds to a current angle that yields a minimum current magnitude for a phase of the electric machine.

5. The vehicle of claim 4, further comprising a thermistor configured to measure temperatures of other phases of the electric machine.

6. The vehicle of claim 1, wherein the one or more controllers are further programmed to determine a distance of vehicle movement based on an angular difference between a current rotor position and the preset position.

7. The vehicle of claim 6, wherein the one or more controllers are further programmed to measure a parking condition of the vehicle via one or more sensors and determine whether the distance of vehicle movement is available based on the parking condition.

8. The vehicle of claim 1, wherein the one or more controllers are further programmed to, responsive to not rotating the electric machine to the preset position in a first direction, rotate the electric machine in a second direction opposite to the first direction to a second preset position.

9. A method for a vehicle including an electric machine, a traction battery, and a wheel mechanically coupled to the electric machine, the method comprising:

responsive to detecting a battery temperature below a threshold and the vehicle being parked, rotating a rotor of the electric machine to a preset position such that the wheel rotates, wherein the preset position corresponds to a current angle that yields a maximum or minimum current magnitude for a phase of the electric machine.

10. The method of claim 9, wherein the vehicle further includes a thermistor, the method further comprising measuring a temperature of the phase via the thermistor.

11. The method of claim 9, wherein the vehicle further includes a thermistor, the method further comprising measuring temperatures of other phases via the thermistor.

12. The method of claim 9, determining a distance of vehicle movement based on an angular difference between a current rotor position and the preset position.

13. The method of claim 12, measuring a parking condition of the vehicle via one or more sensors and determining whether the distance of vehicle movement is available based on the parking condition.

14. The method of claim 9, responsive to not rotating the electric machine to the preset position in a first direction, rotating the electric machine in a second direction opposite to the first direction to a second preset position.

15. A vehicle system comprising:
an electric machine including a rotor; and
one or more controllers programmed to, responsive to detecting a battery temperature below a threshold and the vehicle being parked, rotate the rotor to a preset position corresponding to a current angle that yields a maximum or minimum current magnitude for a phase of the electric machine and such that the wheel rotates.

16. The vehicle system of claim 15, further comprising a thermistor configured to measure a temperature of the phase.

17. The vehicle system of claim 15, further comprising a thermistor configured to measure temperatures of at least two phases of the electric machine.

* * * * *